(12) United States Patent
Amanullah et al.

(10) Patent No.: US 8,835,363 B2
(45) Date of Patent: Sep. 16, 2014

(54) DRILLING, DRILL-IN AND COMPLETION FLUIDS CONTAINING NANOPARTICLES FOR USE IN OIL AND GAS FIELD APPLICATIONS AND METHODS RELATED THERETO

(75) Inventors: Md. Amanullah, Dhahran (SA); Ziad Al-Abdullatif, Khobar (SA)

(73) Assignee: Saudi Arabian Oil Company (SA)

( * ) Notice: Subject to any disclaimer, the term of this patent is extended or adjusted under 35 U.S.C. 154(b) by 623 days.

(21) Appl. No.: 12/816,509

(22) Filed: Jun. 16, 2010

(65) Prior Publication Data

US 2011/0312857 A1    Dec. 22, 2011

(51) Int. Cl.
| | |
|---|---|
| *C09K 8/02* | (2006.01) |
| *C09K 8/10* | (2006.01) |
| *C09K 8/36* | (2006.01) |
| *C09K 8/68* | (2006.01) |
| *C09K 8/588* | (2006.01) |
| *C09K 8/74* | (2006.01) |
| *C09K 8/06* | (2006.01) |
| *C09K 8/03* | (2006.01) |
| *C09K 8/70* | (2006.01) |

(52) U.S. Cl.
CPC ... *C09K 8/06* (2013.01); *C09K 8/03* (2013.01); C09K 2208/10 (2013.01); *C09K 8/70* (2013.01)
USPC ........... 507/103; 507/112; 507/120; 507/140; 507/200; 507/209; 507/225; 507/269; 507/276

(58) Field of Classification Search
USPC ......... 507/103, 112, 110, 120, 140, 141, 200, 507/209, 211, 214, 225, 269, 276, 277; 977/734, 750, 752, 902
See application file for complete search history.

(56) References Cited

U.S. PATENT DOCUMENTS

| | | | |
|---|---|---|---|
| 3,281,354 A * | 10/1966 | Scott et al. ................... | 166/283 |
| 6,783,746 B1 | 8/2004 | Zhang et al. | |
| 7,032,664 B2 * | 4/2006 | Lord et al. ................... | 166/276 |
| 7,109,247 B2 | 9/2006 | Baran, Jr. et al. | |
| 7,449,432 B2 | 11/2008 | Lockwood et al. | |
| 7,470,650 B2 | 12/2008 | Zhang et al. | |
| 7,581,902 B2 | 9/2009 | Zhao et al. | |
| 2004/0242729 A1 | 12/2004 | Baran, Jr. et al. | |
| 2004/0242730 A1 | 12/2004 | Baran, Jr. et al. | |
| 2005/0139144 A1 | 6/2005 | Muller et al. | |
| 2006/0099135 A1 | 5/2006 | Yodh et al. | |
| 2007/0158609 A1 | 7/2007 | Hong et al. | |
| 2007/0158610 A1 | 7/2007 | Hong et al. | |
| 2007/0253888 A1 | 11/2007 | Liu et al. | |
| 2007/0293405 A1 | 12/2007 | Zhang et al. | |
| 2008/0302998 A1 | 12/2008 | Hong et al. | |
| 2009/0082230 A1 | 3/2009 | Javora et al. | |
| 2009/0131289 A1 | 5/2009 | Zhang et al. | |
| 2009/0306276 A1 | 12/2009 | Magnet et al. | |
| 2009/0314549 A1 | 12/2009 | Chenevert et al. | |

FOREIGN PATENT DOCUMENTS

| | | | |
|---|---|---|---|
| EP | 1634938 A1 | | 3/2006 |
| EP | 2338949 A1 | * | 6/2011 |
| FR | 2920782 A1 | | 3/2009 |
| WO | 03106600 A1 | | 12/2003 |
| WO | 2007093725 A2 | | 8/2007 |

OTHER PUBLICATIONS

International Search Report, Dated Sep. 22, 2011, International Application No. PCT/US2011/040413, International Filing Date: Jun. 15, 2011.

* cited by examiner

*Primary Examiner* — Bijan Ahvazi
*Assistant Examiner* — Atnaf Admasu
(74) *Attorney, Agent, or Firm* — Bracewell & Giuliani LLP; Constance Gail Rhebergen; Brad Y. Chin

(57) ABSTRACT

Drilling, drill-in and completion fluids containing nanoparticles for use in hydrocarbon drilling and recovery processes and methods related thereto are provided. The fluids also include a dual acting shield agent that shields the nanoparticles and also acts as a viscosifier. The fluids can be used in various types of hydrocarbon drilling and recovery processes, such as drilling, drill in, completion, and the like.

28 Claims, 1 Drawing Sheet

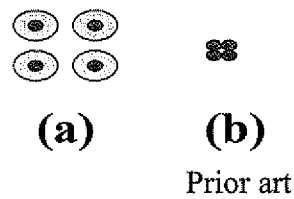
(a) (b)
Prior art

DRILLING, DRILL-IN AND COMPLETION FLUIDS CONTAINING NANOPARTICLES FOR USE IN OIL AND GAS FIELD APPLICATIONS AND METHODS RELATED THERETO

FIELD OF THE INVENTION

This invention relates to drilling, drill-in and completion fluids and related additives for use in oil and gas field applications. More specifically, the present invention relates to drilling, drill-in and completion fluids that include nanoparticles and related additives.

BACKGROUND OF THE INVENTION

Specially formulated fluids are used during drilling and production of hydrocarbons to fulfill different functional requirements, conduct trouble free drilling and production operations, improve drilling efficiency and productivity of wells, and enhance the return on investment. Various types of fluids having different chemical compositions are used in such hydrocarbon drilling and production processes. For example, drilling and drill-in fluids, which are generally composed of a fluid phase, a chemical phase and a solid phase, are used while drilling for hole cleaning, borehole stabilization, cuttings suspension during non circulation, formation damage mitigation while drilling the reservoir section, and the like. As another example, fracturing and stimulating fluids, which are typically composed of a fluid phase, a chemical phase and a pseudo solid phase, are generally used to enhance the productivity of a field, especially a field with very low matrix permeability or a field that has incurred extensive formation damage while drilling.

Each of these fluids performs various functions during the drilling and production applications. For example, during drilling operations, drilling and/or drill-in fluids are circulated through the drill string to exit through the bit nozzles at high speed to remove the cuttings, clean the bit, transport the cuttings to the surface, prevent the fluid loss and particulate invasion to the reservoir, and the like. Similarly, during fracturing or stimulation operations of low permeable formations, a fracturing or stimulation fluid is pumped into the formation to improve the fluid flow characteristics of the field.

Conventional micro and/or macro particle-based fluids are commonly used in many drilling fluids because of their low manufacturing cost and availability in the market at a competitive price. For purposes of this application, the "micro" particle-based fluids generally have an average particle distribution of greater than about 1 micron. The "macro" particle-based fluids generally have an average particle distribution of equal to or greater than about 1 mm.

Although these conventional drilling fluids are effective in many applications, they have limited capability and may not be suitable for some current as well as some future drilling and production operations due to the increasingly challenging conditions of such operations. Many of the micro and/or macro particle-based drilling fluids have limited functional capabilities due to size effect; have low area to volume ratios; are difficult to manipulate to prepare tailored made particles with custom made properties, predominant role of physical and gravitational forces in the particle behavior; and have a lack of quantum effect due to trivial boundary effects.

Over the years, the operational conditions continue to become increasingly more extreme. For example, changes in the operational depth, nature of subsurface geo-hazards with increasing depth, length of horizontal departure to maximize production, complexity of drilling operation, shape of wellbore profiles or number of laterals from a mother bore to maximize reservoir contact, and the like all make drilling and production much more difficult. Moreover, the significant changes in the physical, chemical and thermal conditions of deeper horizons restrict the use of many conventional drilling fluids above a certain operational setpoint due to the limited physical, chemical, thermal and time dependant stability of many current fluids.

Because of the current limitations that exist using conventional drilling fluids, it is often impossible to fulfill certain functional tasks that are essential in challenging drilling and production environments using conventional macro and micro type fluid additives. A need exists for strong, stable, and customizable fluids to use virtually in all areas of oil and gas exploration and exploitation.

Nanoparticles have become increasingly popular in various polymeric compounds. Due to totally different and highly enhanced chemical, mechanical, electrical, physical, thermal, and hydrodynamic properties and interaction potential of nanomaterials compared to their parent materials, the nanoparticles are considered to be a promising material of choice for smart fluid design for oil and gas field applications. Moreover, due to the scope of manufacturing of tailored made nanomaterials with custom made functional behavior, ionic nature, physical shape and sizes, charge density/unit volume, nanotechnology is being used in the development of new drilling fluids defined as the smart fluids for drilling, production, and stimulation related applications.

Unfortunately, the formulation of viable drilling, drill-in, fracturing and stimulation fluids has been difficult using nanoparticles due to the active role of surface and molecular forces in the nanomaterial behavior. The solution to this problem in other industries has been to use a chemical dispersing agent, solvents, surfactants, and various other additives to prepare a viable nanofluid with homogeneous characteristics and long-term stability. Because the oil and gas industry uses huge quantity fluids to drill a well, the high cost of using expensive additives, such as chemical dispersing agents, in the preparation of nanofluids is not feasible for oil and gas field applications.

Drilling fluids are some of the biggest drilling and production costs associated with hydrocarbon recovery. Minimization of the cost factor associated with fluids, especially nano-based fluid is one of the major considerations in nanofluid formulation and preparation. Moreover, nanomaterials are also very costly on their own. The addition of another costly chemical as a dispersing agent could increase the cost of nano-based drilling fluids far beyond the industry acceptable economic norm. The industry needs a technically reliable and economically attractive method for preparation of a stable nano-based drilling fluid to meet the current as well as future technical challenges of the oil and gas industry.

Besides costs, other factors, such as the environmental impact of such drilling fluids, come into play when developing drilling fluids. Due to the enactment of increasingly strict environmental laws and regulations and setting of high environmental norms by environmental protection agencies, local, state or federal governments, environmental factor is another major consideration in oil and gas field applications due to the requirement of huge volume of nanofluids compared to other industries. The oil and gas industry needs an economically attractive and environmentally friendly fluid additive to prepare water-based nanofluids with a view to maintain the environmental friendliness of the fluid.

SUMMARY OF THE INVENTION

In view of the foregoing, drilling and drill-in fluid compositions and related methods are provided as embodiments of the present invention. The drilling and drill-in fluids include an environment friendly and economically attractive additive for steric stabilization of the nanoparticles and generation of required rheological properties in drilling mud systems to fulfill their functional requirements during drilling, completion, production and stimulation processes.

The drilling and drill-in fluid compositions and related methods use nanofluids (i.e., fluids containing nanoparticles). For example, a drilling fluid composition for use in hydrocarbon applications is provided that includes a nanoparticle and a shield agent that at least partially shields the nanoparticle. The resulting drilling fluid is stable and adequately dispersed without the use of additional chemical dispersing agents.

As another embodiment of the present invention, a drilling fluid composition for use in hydrocarbon applications is provided that includes salt water, a shield agent, a nanoparticle having an average particle size in a range of about 1 to about 100 nanometers, and an alkaline additive. Again, the drilling fluids of the present invention perform well and are stable as a result of the use of the shield agent with the nanoparticles.

Besides the compositional embodiments of the present invention, methods of preparing a stable drilling fluid in the absence of a dispersing agent are also provided. For example, in an embodiment, to prepare the stable drilling fluid, water, and a salt are mixed to produce a brine solution. A nanoparticle is then added to the brine solution, followed by a shield agent being added to the brine solution to produce the stable drilling fluid.

In an aspect, the shield agent has an average particle size of less than about 200 micron. The shield agent can include xylose, arabinose, polysaccharides, partially hydrolyzed polyacrylamide, polyanionic cellulose, or combinations thereof.

In another aspect, the nanoparticle includes a carbon nanotube having an average particle size in a range of about 1 nanometers to about 100 nanometers. The nanoparticle can include carbon black, graphene, fullerene, or combinations thereof.

The drilling fluids and related methods can also include additional compounds, such as water, salt, an alkaline additive, or combinations thereof. Each of these compounds is described herein.

The drilling fluids made in accordance with embodiments of the present invention can be used in a wide variety of hydrocarbon drilling operations. For example, the fluids can be used as a drilling fluid, a drill-in fluid, a completion fluid, or combinations thereof. The exact composition of the drilling fluid can be adjusted as needed so that the drilling fluid is customizable for the particular hydrocarbon drilling operation.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

FIG. 1 provides a schematic diagram comparing the nanoparticle combined with the shield agent in accordance with embodiments of the present invention (a) with the nanoparticle used in prior art drilling fluids (b).

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, relating to the claimed invention.

The present invention is directed to drilling fluids and related methods. The drilling fluids are stable and homogeneous nanofluids that can be used in current applications, as well as with future exploration and exploitation of oil and gas resources. The drilling fluids work safely and economically by overcoming the drawbacks of many conventional micro and/or macro-based fluids, such as typical drilling, drill-in, and completion fluids.

As an embodiment of the present invention, a drilling fluid composition for use in hydrocarbon applications is provided that includes a nanoparticle and a shield agent that at least partially shields the nanoparticle. The drilling fluid composition can also include water, salt, an alkaline additive, and various other additives as described herein.

In embodiments of the present invention, the compositions and methods described herein include a shield agent. In an aspect, the shield agent acts like a viscosifier for the drilling fluids of the present invention. The shield agent is a low cost and environmentally friendly organic additive that can act simultaneously as a steric stabilization material for nanoparticles to produce a homogeneous, stable, long lasting nanofluids and as a viscosifier to provide desirable rheological and gel strength properties to the nanofluid to fulfill its functional tasks during drilling and completion of oil and gas fields. In an aspect, the shield agent is bifunctional in that it can provide mechanical shielding for the nanoparticle and also function as a viscosifier for the drilling fluid by providing a viscosifying effect for the fluid phase of the drilling fluid.

As shown in FIG. 1, the shield agent is capable of forming an effective shield around the mechanically dispersed nanoparticles (see (a) in FIG. 1) to prevent the clumping of the nanoparticles together into bundles (see (b) in FIG. 1) and maintain the homogeneity of the drilling fluid both in dynamic and static conditions. The shield agent is water dispersible at room temperature both in the presence and absence of salts for ease of mixing.

In an aspect, the shield agent at least partially shields the nanoparticle so that the nanoparticle and the shield agent are adequately dispersed in the drilling fluid in the absence of an external dispersing agent for use in hydrocarbon drilling applications. The shield agent being present in an amount effective to viscosify the drilling fluid and aid in dispersion of the nanoparticle in the drilling fluid.

It is believed that the shield agent effectively isolates the nanoparticles by at least partially coating the nanoparticles to neutralize the attractive forces generated from the nanoparticles.

The shield agent can be organic or inorganic in nature. In an aspect, the shield agent can be organically derived and environmentally friendly to prevent any detrimental effect to the surrounding environment. The shield agent can be food grade rated. Furthermore, the shield agent can be non-toxic. Each of these attributes makes the shield agent environmentally friendly.

The particle size distribution of the shield agent can vary depending upon the type of system in which the fluid is being used. For example, when the shield agent is organic in nature, the shield agent can have an average particle size distribution of less than about 100 microns to maximize its nano-stabilization effect in a fluid system. In other systems, the shield agent has an average particle size of less than about 200 micron. Other suitable particle size distributions of the shield agent for other types of systems will be apparent to those of skill in the art and are to be considered within the scope of the present invention.

The amount of the shield agent contained in the drilling fluids of the present invention can be varied depending upon the type of system in which the drilling fluid is being used. In an aspect, when added as a dry powder, the shield agent can be used in the range of about 2 to about 6 ppb to stabilize the fluid; alternatively, the shield agent can have a concentration of about 3 to about 5 ppb. Alternatively, the shield agent can be present in a range of about 2 gm/350 ml water to about 5 gm/350 ml water. Other suitable amounts of the shield agent for other types of systems will be apparent to those of skill in the art and are to be considered within the scope of the present invention.

The shield agent can include compounds that are capable of coating and at least partially enclosing the nanoparticle so that drilling fluid is dispersed, stable, and homogeneous in the absence of a dispersing agent. In an aspect, the shield agent comprises a carbohydrate. Specifically, the shield agent can include xylose and arabinose. In another aspect, the shield agent can include polysaccharides (i.e., XC polymer or cellulose), guar gum, partially hydrolyzed polyacrylamide (PHPA), polyanionic cellulose (PAC), or combinations thereof. Other suitable shield agent compounds that are capable of ensuring that the drilling fluid is adequately dispersed, stable, and homogeneous will be apparent to those of skill in the art and are to be considered within the scope of the present invention.

In an aspect, the shield agent can include a crushed husk of the seed of planta *Ovata* (psyllium). To produce the crushed husk of the seed of psyllium, the seeds of psyllium are crushed after drying at a temperature of at least about 105° C., and are then ground to a particle size of less than about 200 microns. In an aspect, the husk is ground to a particle size of less than about 100 microns. Other suitable methods of producing a crushed husk of the seed of psyllium will be apparent to those of skill in the art and are to be considered within the scope of the present invention.

The physical properties of the shield agent can vary depending upon the application in which the drilling fluid is being used. For example, the shield agent of the present invention can be present in flakes that range from about 1 mm long to about 2 mm long. In an aspect, the shield agent can be ground into a powder so that it gels in the presence of water. When the shield agent is ground into a powder, the shield agent powder has an average particle size of less than about 100 microns. Shield agents having different physical properties that are capable of ensuring that the drilling fluid is adequately dispersed, stable, and homogeneous will be apparent to those of skill in the art and are to be considered within the scope of the present invention.

In embodiments of the present invention, the compositions and methods described herein include a nanoparticle. Nanoparticles enable manufacturers to customize the physical properties of various compositions. Use of nanoparticles enables manufacturers to control functional behavior, the ionic nature, the physical shapes and sizes, the charge density, and the like of the compositions containing the nanoparticles, partly because of the high surface area to volume ratio for the nanoparticles. The nanoparticle can include single walled carbon nanotube, a multiwalled carbon nanotube, or combinations thereof. In an aspect, the nanoparticle comprises carbon black, graphene, fullerene, or combinations thereof. In an aspect, the nanoparticle can include different functional groups attached to its backbone. Other suitable types of materials that can be used for the nanoparticles will be apparent to those of skill in the art and are to be considered within the scope of the present invention.

In an aspect, the nanoparticles are mechanically strong, physically small, chemically and thermally stable, biologically degradable, and relatively environmentally benign chemicals that allow for designing smart fluids for use in virtually all hydrocarbon exploration and exploitation. The nanoparticles are operative to increase performance of the drilling fluid due to the nanoparticles having high surface area to volume ratio.

The nanoparticles that are particularly effective in embodiments of the present invention generally have low solids concentration, produce no "spurt" during API filtration, create thin well-dispersed and tight mudcakes, create substantially crystal clear mud filtrate, do not damage formations, reduce the scope of differential sticking, reduce the need for borehole cleaning, and the like. Other desirable physical properties of the nanoparticles will be apparent to those of skill in the art and are to be considered within the scope of the present invention.

The particle size distribution of the nanoparticle can vary depending upon the type of system in which the drilling fluid is being used. For example, the nanoparticle can include a carbon nanotube having an average particle size ranging from about 1 nanometer to about 100 nanometers. Other suitable particle size distributions of the nanoparticle for other types of systems will be apparent to those of skill in the art and are to be considered within the scope of the present invention.

The amount of the nanoparticle contained in the drilling fluids of the present invention can be varied depending upon the type of system in which the drilling fluid is being used. In an aspect, the nanoparticle can be present in the drilling fluid in the range of about 0.1 ppb to about 0.5 ppb per about 350 ml of water to stabilize the fluid. Alternatively, the nanoparticle can be present in the drilling fluid in a range of about 0.1 gm/350 ml water to about 2.0 gm/350 ml water; or alternatively, in a range of about 0.2 gm/350 ml water to about 0.5 gm/350 ml water. Other suitable amounts of the nanoparticle for other types of systems will be apparent to those of skill in the art and are to be considered within the scope of the present invention.

In embodiments of the present invention, the amounts of the shield agent and the nanoparticle can be varied with respect to each other. Using the nanoparticles in combination with the shield agent enables the use of less nanoparticles when compared with other drilling fluids using nanoparticles. For example, the shield agent and the nanoparticle can be present in a weight ratio of about 4:1 to about 10:1 respectively. Other suitable amounts of the shield and the nanoparticle will be apparent to those of skill in the art and are to be considered within the scope of the present invention.

Besides the shield agent and the nanoparticle, the drilling fluids and related methods described herein can include various other components. For example, the drilling fluid can also include water and a salt. The water can be salt water or fresh water. In an aspect, the salt can be present in a range of about 0 to about 20 wt. %; or alternatively, in a range of about 5 to about 10 wt. %. The amount of salt included in the drilling fluid can be varied, as needed for the conditions of the formations, as will be apparent to those of skill in the art and are to be considered within the scope of the present invention.

Various types of salts can be used in embodiments of the present invention. For example, in an aspect, the salt can be potassium chloride, sodium chloride, calcium chloride, or combinations thereof. Other suitable types of salts that can be used in embodiments of the present invention will be apparent to those of skill in the art and are to be considered within the scope of the present invention.

Besides water and salt, an alkaline additive can be used in embodiments of the present invention to adjust the pH of the drilling fluid. In an aspect, the alkaline additive can include sodium hydroxide, potassium hydroxide, calcium oxide, calcium hydroxide, or combinations thereof. The amount of the alkaline additive can vary, depending upon the formation conditions and the type of treatment that is being applied. For example, the alkaline additive can be present in a range of about 2 cc to about 2.5 cc per about 350 cc of the drilling fluid composition. Other types and amounts of alkaline additives can be used in embodiments of the present invention, as will be apparent to those of skill in the art and are to be considered within the scope of the present invention.

As another embodiment of the present invention, a drilling fluid composition for use in hydrocarbon applications is provided that includes salt water, a shield agent, a nanoparticle having an average particle size in a range of about 1 to about 100 nanometers, and an alkaline additive. As with other embodiments of the present invention, the resulting drilling fluid composition is stable for extended periods of time, is environmentally friendly, and capable of being customized to suit the particular process demands of the particular drilling application in which it is being used.

Besides the compositional embodiments, methods of preparing a stable drilling fluid in the absence of a dispersing agent are also provided as embodiments of the present invention. In this embodiment, water and a salt are mixed to produce a brine solution. To mix the water and the salt, the desired volume of water is measured along with the desirable percentage of salt to simulate down hole fluid chemistry of formation fluids. The water is then stirred at the highest possible mixing speed without causing any splashing of water under the hydrodynamic action of the rotating spindle of the mixture and the fluid turbulence created by the mixing action. The use of high speed mechanical agitation followed by the steric stabilization of the nanoparticles using an optimum concentration of an organic shield agent lead to the development of a homogeneous and stable nanofluid suitable for use as a drilling fluid.

Once the water has been mixed, the desired amount of salt is added to the agitating fluid and mixed for about 3 to about 5 minutes to produce a brine solution that represents a particular formation fluid.

The nanoparticle is then added to the brine solution. To add the nanoparticle to the brine solution, the desired mass of nanoparticles is measured and added slowly in a distributed pattern to the turbulent water to prevent any clumping of the nanoparticles together into bundles during adding the nanoparticles to the fluid. The nanoparticles are then mixed for about 5 to about 7 minutes at high speed without splashing any fluid to overcome the attraction, flocculation and aggregation action of van der Waals and molecular forces by the action of the mechanical forces of rotating spindle and the hydrodynamic forces of fluid turbulence. The nanoparticle is added to the brine solution at a speed operable to disperse the nanoparticle throughout the brine solution.

Once the nanoparticles have been added to the brine solution, a shield agent is then added to the brine solution to produce the stable drilling fluid. To add the shield agent to the brine solution, the desired amount of the shield agent is measured and slowly added in a distributed pattern. The amount of the shield agent used is that which is needed for steric stabilization of the mechanically dispersed particles to prevent the flocculation, clumping, aggregation and bundling of the nanoparticles after the cessation of hydrodynamic condition created by the mechanical energy from the rotating spindle. The amounts of the shield agent described herein can be used in embodiments of the present invention. In an aspect, the shield agent is added slowly in a distributed pattern to prevent clumping and lumping of the shield agent and maximize its steric stabilization effect in the nanoparticle-containing fluids.

While adding the shield agent to the brine solution, the rotating speed of the spindle can be increased as the shield agent thickens the fluids to increase the hydrodynamic condition and maximize the steric stabilization capability of the shield agent. In an aspect, the shield agent is added to the brine solution at a speed operable to Overcome attractive, flocculation, and aggregation action of van der Waals and molecular forces to produce a stable drilling fluid such that the plastic viscosity (PV) ranges from about 0 cP to about 25 cP. It is preferable for the PV to be as low as possible. Suitable rotating speeds besides those described herein will be apparent to those of skill in the art and are to be considered within the scope of the present invention.

In operation, it is believed that when the shield agent comes into contact with water or water-based systems, the shield agent swells and is dispersed under hydrodynamic agitation. If the shield agent is used in oil-based systems, no swelling occurs. The shield agent improves the viscosity of the water-based drilling fluids through its swelling and cross-linking mechanisms.

To ensure that a well dispersed fluid is produced, the fluid containing the nanoparticles and the shield agent can be mixed for about 20 to about 25 minutes at the highest possible speed for homogenization and stabilization of the nanoparticles. The mixing time can be adjusted as necessary to allow for homogenization and stabilization of the nanoparticles. Suitable mixing times will be apparent to those of skill in the art and are to be considered within the scope of the present invention.

The pH can be maintained within a predetermined range for the stable fluid. In an aspect, the method embodiments of the present invention can also include the step of adjusting the pH of the stable fluid to a range of about 9.5 to about 10. To adjust the pH, sodium hydroxide, potassium hydroxide, calcium oxide, calcium hydroxide, or combinations thereof can be added to the stable fluid. Adjusting the pH helps prevent any bacterial degradation of the drilling fluid and the generation of any offensive odor after long term storage. Other suitable methods of and compounds for adjusting the pH of the stable drilling fluid will be apparent to those of skill in the art and are to be considered within the scope of the present invention.

To further stabilize the drilling fluid, the fluid containing the nanoparticles can be kept in static condition for about 1 to about 2 hours to stabilize inter-particle forces before measurement of the fluid properties. The stabilization time can be adjusted as necessary to allow for stabilization of the fluids.

Suitable stabilization times will be apparent to those of skill in the art and are to be considered within the scope of the present invention.

In an aspect, the step of adding the shield agent to the brine solution includes stericly stabilizing the nanoparticle by at least partially encapsulating the nanoparticle. As described herein and as shown in FIG. 1, the shield agent surrounds and at least partially shields the nanoparticles (see (a) of FIG. 1) to help ensure that the nanoparticles do not stick together (see (b) of FIG. 1) and are adequately dispersed.

In the method embodiments described herein, the mixing steps can generally be performed using a mixer, such as a Hamilton Beach mixer, with low, medium, and high shearing indicators. To maximize dispersion, the high shearing settings can be used. It is also believed that a high speed homogenizer would be sufficient to accomplish the method steps described herein. Other suitable types of equipment that can be used will be apparent to those of skill in the art and are to be considered within the scope of the present invention.

The compositions and methods described herein can be used in various types of drilling fluids. The type of fluid that is used will depend upon the drilling application or process that is being used. For example, the fluid can be a drilling fluid, a drill-in fluid, a completion fluid, or combinations thereof. The fluids and related methods can be used in other types of oil and gas applications, as will be apparent to those of skill in the art and are to be considered within the scope of the present invention.

The exact composition of the drilling fluid can vary, depending upon the conditions of the formation and the type of drilling that is being performed. For example, when the fluid is a drilling fluid or a drill-in fluid, the composition can be the same or slightly modified as needed for the operational constraints. When the fluid is a fracturing fluid, the amount of the shield agent can be higher than other types of fluids to generate higher viscous properties of the fluid. For stimulation applications, the viscous properties can be higher or lower than other fluids depending on the reservoir properties. The optimal composition for the fluid will be apparent to those of skill in the art and are to be considered within the scope of the present invention.

As an advantage of the present invention, the nano-based drilling, drill-in and completion fluids are physically stable without the use of a chemical dispersant. In prior attempts to produce nanofluids, a chemical dispersant was needed to create a good dispersion. Typical dispersants used in nanofluids include sodium dodecyl sulphate and nanopersene. These chemical dispersants are relatively expensive and may pose environmental issues, particularly when trying to dispose of the nanofluids. The methods of making the drilling fluids of the present invention use mechanical energy, along with the steric stabilization potential of the shield agent to formulate the drilling fluids so that the fluids remain stable for more than one week without any separation of phases, precipitation of gellants, changing of color or consistency of the fluid. The elimination of the chemical dispersant so that the fluid is essentially free of a chemical dispersant should reduce the cost of producing nano-based fluids because the chemical dispersants are fairly expensive.

Traditional prior art drilling fluids can remain fully stable from a couple of days to a couple of weeks. The drilling fluids made in accordance with embodiments of the present invention remain stable for more than two weeks, which is more than sufficient for most oil and gas field applications.

As another advantage of the present invention, when the drilling application is complete, as indicated previously, there is no need for special disposal procedures because the shield agent can be disposed of along with the waste water.

EXAMPLE

A drilling fluid containing nanoparticles in accordance with embodiments of the present invention was prepared by mixing 350 cc water and 5% (by weight of water) salt, 0.5 gm nanoparticles (nano), 5 gm organic shield agent (SA), and 2 cc 1N sodium hydroxide to raise the fluid pH to 9.5-10. All the fluid components were mixed for a period of time that was sufficient to produce a homogeneous, well dispersed, and stable nanoparticle-containing fluid for oil and gas field applications. Maintenance of pH in the alkaline range was performed to prevent any bacterial degradation of the shield agent and to prevent generation of any offensive smell after extended storage. A six-speed VG FANN viscometer was used to measure the drilling fluid rheological profile at 600, 300, 200, 100, 6, and 3 rpm along with the 10 seconds and 10 minutes gel strength of the fluid. Measurements were taken after preparation and after 18 hours of storage in static condition to evaluate the long term stability of the fluid.

The fluid was allowed to rest for 1-2 hours immediately after preparation of the fluid to stabilize the inter-particle attractive and repulsive forces and produce a stable steric effect by the viscosifier/shield agent coated nanoparticles and then transferred to a VG Fan viscometer to measure the viscosity and gel strength characteristics of the fluid at room temperature. After measurement of the rheological properties, the fluid containing the nanoparticles was transferred to an API cell to measure API fluid loss and deposited mudcake thickness. A test pressure of 100 psi was applied on top of the fluid during testing as per API standard. After 30 minutes, the volume of filtrate was measured and the thickness of the deposited mudcake was estimated. These properties were measured again after 18 hours of static aging of a duplicate fluid to evaluate the long term stability of the fluid (see Table 1). Visual observations were made and long term stability was evaluated using another sample of the fluid that was kept in storage for 12 days for static aging.

TABLE 1

Rheological and Filtration Properties of Drilling Fluids Containing Nanoparticles

| VG Fann Readings | Sample 1: 0.5 gm Nano + 5 gm SA | | Sample 2: 0.5 gm Nano + 5 gm SA (after 12 days for static aging) | | Sample 3: 0.5 gm Nano + 2 gm SA | Sample 4: 0 gm Nano + 5 gm SA |
|---|---|---|---|---|---|---|
| @600 rpm, cP | 86 | 89 | 78 | 84 | 8 | 74 |
| @300 rpm, cP | 62 | 67 | 56 | 60 | 4 | 51 |
| @200 rpm, cP | 53 | 57 | 47 | 52 | 3 | 44 |
| @100 rpm, cP | 37 | 44 | 34 | 39 | 2 | 33 |
| @6 rpm, cP | 6 | 8 | 7 | 8 | 1 | 7 |
| @3 rpm, cP | 4 | 6 | 4 | 6 | 0 | 4 |

TABLE 1-continued

Rheological and Filtration Properties of Drilling Fluids Containing Nanoparticles

| VG Fann Readings | Sample 1: 0.5 gm Nano + 5 gm SA | Sample 2: 0.5 gm Nano + 5 gm SA (after 12 days for static aging) | | Sample 3: 0.5 gm Nano + 2 gm SA | Sample 4: 0 gm Nano + 5 gm SA |
|---|---|---|---|---|---|
| Gel 10 sec lbs/100 ft$^2$ | 6 | 8 | 6 | 7 | 2 | 7 |
| Gel 10 min lbs/100 ft$^2$ | 5 | 7 | 5 | 6 | 1 | 5 |
| pH | 10 | 9.82 | 9.74 | 9.51 | 7 | 10.17 |
| PV (cP) | 24 | 22 | 22 | 24 | 4 | 23 |
| YP (lbs/100 ft$^2$) | 38 | 45 | 34 | 36 | 0 | 28 |
| YP/PV | 1.58 | 2.05 | 1.55 | 1.5 | — | 1.22 |
| Remark | Rheology readings were taken after mixing | Rheology readings were taken after 18 hrs | Rheology readings were taken after mixing | Rheology readings were taken after 18 hrs | Rheology readings were taken after mixing | Rheology readings were taken after mixing |
| API Fluid Loss (cc) | — | 11.5 | — | 13.5 | 17 | 18 |
| Mudcake Thickness (mm) | — | <1 | — | <1 | <1 | >1 |

The data shown in Table 1 demonstrates the suitability of the newly identified, conditioned and processed shield agent to produce a homogeneous, stable, and long lasting nano fluid by the combined action of mechanical energy and the steric stabilization capacity of the shield agent. The shield agent also demonstrates its potential to generate required rheological and thixotropic characteristics in the nanofluid to fulfill the functional tasks of the nanofluid. The dual functional organic shield agent can produce a viable nanofluid that is homogeneous, stable, and long lasting for oil and gas field applications. The data showing fluid properties immediately after preparation and after 18 hours of static aging indicate virtually no changes in the rheological and gel strength characteristics of the nanofluids and thus demonstrate the long term stabilization potential of the newly identified dual functional shield agent with the use of nanoparticles.

The prepared nanofluids were examined after 12 days for precipitation of flocculants, aggregates, clumps or bundles of nanoparticles. The examination of the nanofluid properties containing 5 gm and 2 gm shield agent indicate the requirement of a suitable or optimum concentration of the shield agent to achieve desirable fluid properties and improve steric stabilization of the nanoparticles. Precipitation of flocculants, aggregates, clumps or bundles of nanoparticles was observed in the fluid sample containing 2 gm shield agent, which demonstrates an optimum amount of shield agent.

As indicated in Table 1, a very thin mudcake with desirable fluid loss properties formed in the samples containing 5 gm shield agent. The formation of a thin mudcake demonstrates the smartness of the nano-based fluids and thus indicates its suitability to use in troublesome differential sticking prone zones to minimize mud related pipe sticking problems. The crystal clear character of the nanofluid filtrate and the absence of any spurt loss also demonstrate the smartness of the fluid from formation damage elimination point of view and thus highlights it potential application in tight gas reservoirs.

It is to be understood that the present invention is not limited to specific applications and embodiment illustrated and described herein, but embraces such modified forms thereof as come within the scope of the appended claims.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A drilling, drill-in and completion fluid additive for use in a fluid composition comprising:
    a nanoparticle, the nanoparticle having an average particle size in a range of about 1 nm to about 100 nm and being operative to increase performance of the fluid due to the nanoparticle having high surface area to volume ratio; and
    a shield agent, the shield agent being operative to at least partially shield the nanoparticle so that the nanoparticle and the shield agent are adequately dispersed in the fluid in the absence of an external dispersing agent for use in drilling and completion applications, and the shield agent being present in an amount effective to viscosify the fluid and aid in dispersion of the nanoparticle in the fluid, wherein the shield agent comprises xylose and arabinose.

2. The composition of claim 1, wherein the shield agent has an average particle size of less than about 200 micron.

3. The composition of claim 1, wherein the nanoparticle comprises a single wall nanotube, a multiwall nanotube, or combinations thereof.

4. The composition of claim 1, wherein the nanoparticle comprises carbon black, graphene, fullerene, or combinations thereof.

5. The composition of claim 1, wherein the fluid composition further comprises water and a salt.

6. The composition of claim 5, wherein the salt is present in the fluid composition in a range of about 0 to about 20 wt. %, the shield agent is present in the fluid composition in a range of about 2 ppb (pounds per barrel) to about 6 ppb, and the nanoparticle is present in the fluid composition in a range of about 0.1 ppb to about 0.5 ppb per about 350 ml of water.

7. The composition of claim 5, wherein the salt is potassium chloride, sodium chloride, calcium chloride, or combinations thereof.

8. The composition of claim 1, wherein the shield agent and the nanoparticle are present in the fluid additive in a weight ratio of about 4:1 to about 10:1 respectively.

9. The composition of claim 1, further comprising an alkaline additive comprising sodium hydroxide, potassium hydroxide, calcium oxide, calcium hydroxide, or combinations thereof.

10. The composition of claim 9, wherein the alkaline additive is present in the composition in a range of about 2 cc to about 2.5 cc per about 350 cc of the fluid composition.

11. The composition of claim 1, wherein the fluid composition is operative to function as a drilling fluid, a drill-in fluid, a completion fluid, or combinations thereof.

12. The composition of claim 1, wherein the fluid composition is essentially free of an external dispersing agent.

13. A drilling fluid composition for use in hydrocarbon applications comprising:
salt water;
a nanoparticle, the nanoparticle having an average particle size in a range of about 1 nm to about 100 nm and being operative to increase performance of the drilling fluid composition due to the nanoparticle having high surface area to volume ratio;
a shield agent, the shield agent being operative to at least partially shield the nanoparticle so that the nanoparticle and the shield agent are adequately dispersed in the drilling fluid composition in the absence of an external dispersing agent for use in drilling applications, the shield agent being present in an amount effective to viscosify the drilling fluid composition and aid in dispersion of the nanoparticle in the drilling fluid composition, wherein the shield agent comprises xylose and arabinose; and
an alkaline additive, the alkaline additive being operative to adjust a pH of the drilling fluid composition in a range of about 9.5 to about 10 to prevent degradation of the drilling fluid composition and generation of any offensive odor after storage of the drilling fluid composition.

14. The composition of claim 13, wherein the shield agent has an average particle size of less than about 200 micron.

15. The composition of claim 13, wherein the nanoparticle comprises carbon black, graphene, fullerene, or combinations thereof.

16. The composition of claim 13, wherein the drilling fluid composition is operative to function as a drilling fluid, a drill-in fluid, a completion fluid, or combinations thereof.

17. A method of preparing a stable drilling fluid in the absence of a dispersing agent comprising the steps of:
mixing water and a salt to produce a brine solution at a speed operable to promote a turbulent condition for a length of time sufficient to create a substantially homogeneous solution;
adding a nanoparticle to the brine solution at a speed operable to disperse the nanoparticle throughout the brine solution, the nanoparticle having an average particle size in a range of about 1 to about 100 nanometers;
adding a shield agent to the brine solution at a speed operable to overcome attractive, flocculation, and aggregation action of van der Waals and molecular forces to produce the stable drilling fluid such that the viscosity ranges from about 0 cP to about 25 cP, the shield agent having an average particle size of less than about 200 micron, wherein the shield agent comprises xylose and arabinose; and
adjusting a pH of the stable drilling fluid to a range of about 9.5 to about 10 to prevent bacterial degradation of the stable drilling fluid and generation of any offensive odor after storage of the stable drilling fluid.

18. The method of claim 17, wherein the step of adjusting the pH of the stable drilling fluid includes adding sodium hydroxide, potassium hydroxide, calcium oxide, calcium hydroxide, or combinations thereof to the stable drilling fluid.

19. The method of claim 17, wherein the nanoparticle comprises carbon nanotubes, graphene, carbon black, or combinations thereof.

20. The method of claim 17, wherein the nanoparticle is present in a range of about 0.1 ppb to about 0.5 ppb by weight per barrel of the stable drilling fluid and the shield agent is present in a range of about 2 ppb to about 6 ppb by weight per barrel of the stable drilling fluid.

21. The method of claim 17, wherein the shield agent and the nanoparticle are added in a weight ratio of about 4:1 to about 10:1 respectively.

22. The method of claim 17, wherein the step of adding the shield agent to the brine solution includes stericly stabilizing the nanoparticle by at least partially shielding the nanoparticle.

23. The method of claim 17, wherein the stable drilling fluid composition is a drilling fluid, a drill-in fluid, a completion fluid, or combinations thereof.

24. A method of drilling a hydrocarbon formation comprising the step of contacting the hydrocarbon formation with a drilling fluid composition comprising:
water;
a salt;
a nanoparticle being operative to increase performance of the drilling fluid composition due to the nanoparticle having high surface area to volume ratio, the nanoparticle having an average particle size in a range of about 1 nm to about 100 nm; and
a shield agent that at least partially shields the nanoparticle so that the nanoparticle and the shield agent are adequately dispersed in the drilling fluid composition in the absence of an external dispersing agent for use in drilling and completion applications, the shield agent being present in an amount effective to viscosify the drilling fluid composition and aid in dispersion of the nanoparticle in the drilling fluid composition, wherein the shield agent comprises xylose and arabinose.

25. The method of claim 24, wherein the method of drilling formations comprises drilling, completing, or combinations thereof.

26. The method of claim 24, wherein the nanoparticle comprises carbon black, graphene, fullerene, or combinations thereof.

27. The method of claim 24, wherein the shield agent and the nanoparticle are present in the drilling fluid composition in a weight ratio of about 4:1 to about 10:1 respectively.

28. The method of claim 24, wherein the salt is present in the drilling fluid composition in a range of about 0 to about 20 wt. %, the shield agent is present in the drilling fluid composition in a range of about 2 ppb to about 6 ppb, and the nanoparticle is present in the drilling fluid composition in a range of about 0.1 ppb to about 0.5 ppb per about 350 ml of water.

* * * * *